US008568267B2

(12) United States Patent  (10) Patent No.: US 8,568,267 B2
Ohnemus et al.  (45) Date of Patent: Oct. 29, 2013

(54) PLANETARY-GEAR AUTOMATIC TRANSMISSION

(71) Applicant: Bayerische Motoren Werke Aktiengesellschaft, Munich (DE)

(72) Inventors: Ulrich Ohnemus, Hattenhofen (DE); Tilo Maschall, Munich (DE); Alexander Martin, Munich (DE); Lothar Wolf, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/648,730

(22) Filed: Oct. 10, 2012

(65) Prior Publication Data

US 2013/0035195 A1   Feb. 7, 2013

Related U.S. Application Data

(63) Continuation of application No. PCT/EP2011/002371, filed on May 13, 2011.

(30) Foreign Application Priority Data

May 28, 2010 (DE) .......................... 10 2010 029 468
Oct. 1, 2010 (DE) .......................... 10 2010 041 883

(51) Int. Cl.
*F16H 3/62* (2006.01)
(52) U.S. Cl.
USPC ...................................................... 475/275
(58) Field of Classification Search
USPC ............................................... 475/275
See application file for complete search history.

(56) References Cited

U.S. PATENT DOCUMENTS

| 2,912,884 A | 11/1959 | Christenson et al. |
| 4,531,428 A | 7/1985 | Windish |
| 4,744,267 A | 5/1988 | Lepelletier |
| 2005/0090352 A1 | 4/2005 | Armstrong et al. |
| 2009/0048059 A1* | 2/2009 | Phillips et al. ................ 475/275 |

FOREIGN PATENT DOCUMENTS

| CH | 390 022 | 3/1965 |
| DE | 1 149 218 | 5/1963 |
| DE | 10 2004 051 610 A1 | 6/2005 |
| EP | 0 733 834 A2 | 9/1996 |
| GB | 945942 | 1/1964 |

OTHER PUBLICATIONS

International Search Report dated Aug. 31, 2011 including English-language translation (Six (6) pages).
German Office Action dated Aug. 7, 2013, with machine English translation (Twelve (12) pages).

* cited by examiner

*Primary Examiner* — Edwin A Young
(74) *Attorney, Agent, or Firm* — Crowell & Moring LLP

(57) ABSTRACT

A planetary-gear automatic transmission, in particular a planetary-gear automatic transmission includes at least eight forward gear positions. For shifting the individual gear positions, shifting devices formed by clutches and/or brakes are provided. For actuating the shifting devices, shift actuators are provided which generate assigned actuating forces. The planetary-gear automatic transmission is constructed such that all shift actuators can be arranged or are arranged directly on or directly in the area of the assigned shifting devices.

11 Claims, 2 Drawing Sheets

PLANETARY-GEAR AUTOMATIC TRANSMISSION

CROSS REFERENCE TO RELATED APPLICATIONS

This application is a continuation of PCT International Application No. PCT/EP2011/002371, filed May 13, 2011, which claims priority under 35 U.S.C. §119 from German Patent Application Nos. 10 2010 029 468.3, filed May 28, 2010, and 10 2010 041 883.8, filed Oct. 1, 2010, the entire disclosures of which are herein expressly incorporated by reference.

BACKGROUND AND SUMMARY OF THE INVENTION

The present invention relates to a planetary-gear automatic transmission and, in particular, to a planetary-gear automatic transmission having at least eight forward gear positions, wherein for shifting the individual gear positions, shifting devices formed by clutches and/or brakes are provided, and for actuating the shifting devices, shift actuators are provided which generate assigned actuating forces.

The state of the art consists of an automatic transmission having eight forward gears. For increasing the possibility of lowering fuel consumption, automatic-transmission concepts having nine or more gears are being explored. As the number of gears increases, however, the installation space available in the vehicle for the transmission is increasingly becoming a bottleneck.

Planetary-gear automatic transmissions are shifted by the closing or opening of clutches and/or brakes. In the case of diverse transmission concepts, which have a plurality of forward gears, up to now at least some of the clutches of the transmission had to be placed such that they are accessible only by constructively very high-expenditure rotary transmission leadthroughs or, in the case of an electric operation, by way of slip ring actuators.

FIG. 1 is a schematic illustration of an example of a planetary-gear automatic transmission 1, where the two clutches 2 can be operated only by way of very high technical expenditures. At least, it is not possible to arrange a shift actuator in the area of the two clutches because an element that rotates during the operation is situated radially outside the two clutches 2.

The arrangement of shift actuators in the case of the clutches 2 of the transmission illustrated in FIG. 2 has similar difficulties.

It is an object of the invention to provide a planetary-gear automatic transmission, particularly a planetary-gear automatic transmission having at least eight forward gear positions, which has an advantageous construction with respect to the arrangement of the shift actuators.

This and other objects are achieved by a planetary-gear automatic transmission, particularly, a planetary-gear automatic transmission having at least eight forward gear positions, wherein for shifting the individual gear positions, shifting devices formed by clutches and/or brakes are provided, and for actuating the shifting devices, shift actuators are provided which generate assigned actuating forces. The planetary-gear automatic transmission is constructed such that all shift actuators are arrangeable directly on or directly in the area of the assigned shifting devices.

The starting point of the invention is a planetary-gear automatic transmission, particularly a planetary-gear automatic transmission having at least eight forward gear positions. For shifting the individual (forward) gear positions, shifting devices are provided. The shifting devices can be formed by clutches or brakes. For the actuation of the shifting devices, clutches or brakes, shift actuators are provided. The term "shift actuator" should be interpreted extremely broadly. In principle, it includes all devices suitable for generating actuating forces for actuating the shifting devices. Particularly hydraulic or electric shift actuators are relevant to planetary-gear automatic transmissions.

In accordance with the invention, the planetary-gear automatic transmission is constructed such that all shift actuators of the transmission can be arranged or are arranged directly on or directly in the area of the assigned shifting devices.

The invention is therefore clearly distinguished from "interlocked transmission concepts", as illustrated, for example, in FIGS. 1 and 2. The individual shifting devices have "force introduction points". Force introduction points are "points" at which actuating forces are introduced into the concerned shifting device by the assigned shift actuator. According to a further aspect of the invention, the force introduction points of all shift actuators are accessible from a case of the planetary-gear automatic transmission. This is specifically not so in the case of the clutches 2 illustrated in FIGS. 1 and 2.

Preferably, all shift actuators are fastened directly to the case of the transmission or to a supporting device assigned to the corresponding shift actuator. The supporting device or the supporting devices is connected with the transmission case.

According to a further aspect of the invention, the planetary-gear automatic transmission has at least one "multiple shift actuator". A "multiple shift actuator" is a shift actuator to which at least two shifting devices are functionally assigned. Three or more shifting devices may also be assigned to a shift actuator. The higher the "rank" of such multiple shift actuators, the more compact the construction of the transmission tends to be.

It may be provided that a shift actuator, to which two or more shifting devices are functionally assigned, is provided for optionally actuating: (a) one shifting device assigned to it, (b) simultaneously several of the shifting devices assigned to it, or (c) simultaneously all of the shifting devices assigned to it.

With respect to the construction, it is advantageous for a multiple shift actuator for the shifting devices functionally assigned to it to not have to be actuated simultaneously. It may correspondingly be provided that, of the shifting devices functionally assigned to a shift actuator, always only one can be actuated or is actuated.

The invention is suitable particularly for planetary-gear automatic transmissions which have four or more planetary gear sets and six or more shifting devices.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
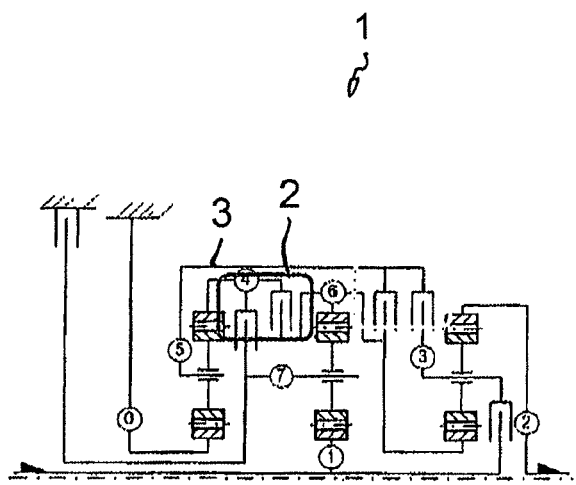
FIGS. 1 and 2 are schematic illustrations of known planetary-gear automatic transmissions.
Figure 2:
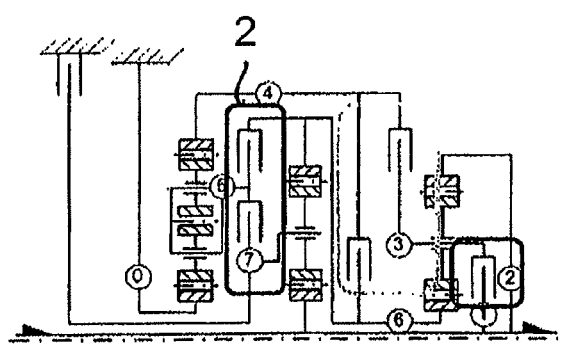
Figure 3:
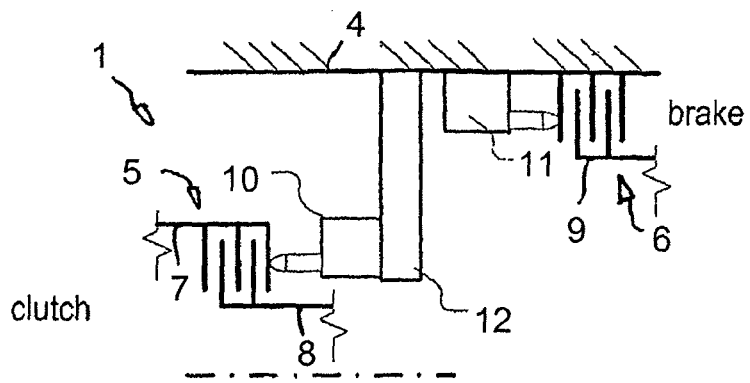
FIG. 3 illustrates the basic principle of the arrangement of shift actuators according to the invention in a view of a cutout of a planetary-gear automatic transmission 1 which has a transmission case 4.

Referring to FIG. 3, which is a cutout of a planetary-gear automatic gear transmission 1 having a transmission case 4, the planetary-gear automatic transmission 1 has a clutch 5 and a brake 6. According to its definition, a clutch is provided for the rotational coupling of two rotatably arranged transmission elements 7, 8. According to the definition, a brake is provided for the locking or releasing of a rotatably arranged transmission element 9 with respect to the casing 4 of the planetary-gear automatic transmission 1.

In the following, clutches and brakes are generically called "shifting devices". For actuating the clutch 5 indicated in FIG. 3, a first shift actuator 10 is provided, and for actuating the brake 6, a second shift actuator 11 is provided. The shift actuator 10 is connected by way of a supporting element 12 with the transmission case 4. The supporting element 12 projects radially toward the interior from the transmission case 4. The shift actuator 11 is fastened directly to the transmission case 4 in the interior.

Figure 4:
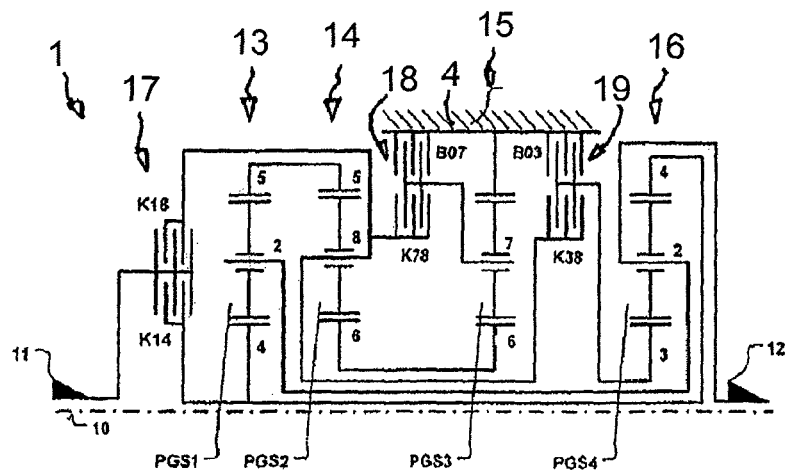
FIGS. 4 and 5 are views of embodiments of transmissions having individual and multiple shift actuators which are arranged in the manner according to the invention.

FIG. 4 illustrates a planetary-gear automatic transmission 1 having four planetary gear sets 13 to 16 and three double shifting devices 17 to 19. The double shifting device 17 is formed by the two clutches K14 and K18. The double shifting device 18 is formed by the clutch K78 and the brake B07. The double shifting device 19 is formed by the clutch K38 and the brake B03. Double or multiple shifting devices are distinguished by the fact that one shift actuator is functionally assigned to several shifting devices (clutches and brakes respectively). Thus, for example, the two clutches K14 and K18 are actuated by way of one shift actuator (compare FIG. 3) not shown here in detail.

As illustrated in FIG. 4, the three double shifting devices 17 to 19 are arranged such that they are accessible from the transmission case 4. The shift actuators (not shown) assigned to the double shifting devices 17 to 19 can therefore be arranged directly at or in the area of the assigned double shifting devices 17 to 19. Thus, as illustrated in FIG. 3, the shift actuators can be either fastened directly to the transmission case 4 or be connected with the transmission case 4 by way of a holding device 12.

Figure 5:
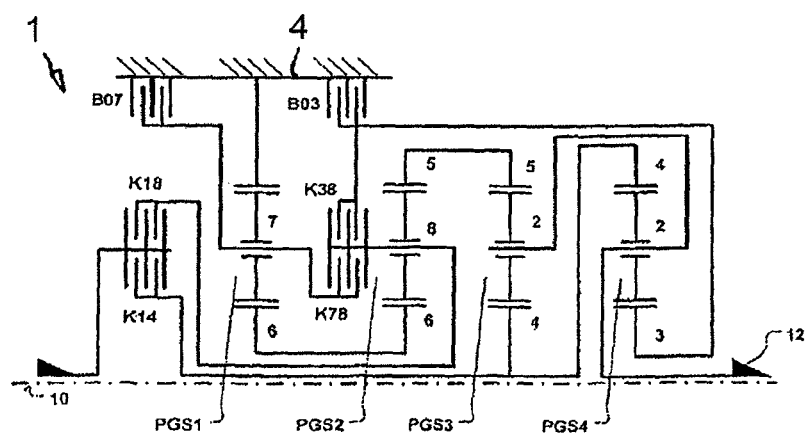

FIG. 5 illustrates an embodiment of a planetary-gear automatic transmission 1, which also has four planetary gear positions and four shifting devices. One shifting device is formed by the brake B07; another shifting device is formed by the brake B03. The concerned shift actuators can be fastened directly to the transmission case 4. The two other shifting devices are constructed as double shifting devices. One double shifting device is formed by the clutches K14 and K18. The other double shifting device is formed by the clutches K38 and K78. Also, these two double shifting devices can each be actuated by way of a single shift actuator, which may be connected with the transmission case 4, for example, by way of a holding device 12, as illustrated in FIG. 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A planetary-gear automatic transmission having a plurality of forward gear positions, comprising:
    shifting devices operatively configured for shifting individual ones of the gear positions, said shifting devices being at least one of clutches and brakes;
    shift actuators operatively configured for actuating assigned ones of the shifting devices, the shift actuators generating assigned actuating forces;
    wherein the planetary-gear automatic transmission comprises at least eight forward gear positions and is structured to have all of the shift actuators arranged directly on or directly in an area of the assigned shifting devices.

2. The planetary-gear automatic transmission according to claim 1, further comprising:
    a housing of the planetary-gear automatic transmission; and
    wherein the shifting devices have force introduction points at which actuating forces are introduced by an assigned shift actuator, said force introduction points of all of the shift actuators being accessible from the housing of the planetary-gear automatic transmission.

3. The planetary-gear automatic transmission according to claim 2, wherein:
    all shift actuators are fastened directly to the housing of the planetary-gear automatic transmission, or
    all shift actuators are fastened to a supporting device assigned to a respective shift actuator, the supporting device being connected with the housing of the planetary-gear automatic transmission.

4. The planetary-gear automatic transmission according to claim 3, wherein at least one shift actuator is provided to which at least two shifting devices are functionally assigned.

5. The planetary-gear automatic transmission according to claim 1, wherein:
    all shift actuators are fastened directly to the housing of the planetary-gear automatic transmission, or
    all shift actuators are fastened to a supporting device assigned to a respective shift actuator, the supporting device being connected with the housing of the planetary-gear automatic transmission.

6. The planetary-gear automatic transmission according to claim 1, wherein at least one shift actuator is provided to which at least two shifting devices are functionally assigned.

7. The planetary-gear automatic transmission according to claim 6, wherein the at least one shift actuator has three shifting devices functionally assigned thereto.

8. The planetary-gear automatic transmission according to claim 1, wherein a shift actuator is provided, to which two or more shifting devices are functionally assigned, the shift actuator being provided for optionally actuating:
    one shifting device assigned to it;
    simultaneously several shifting devices assigned to it; or
    simultaneously all shifting devices assigned to it.

9. The planetary-gear automatic transmission according to claim 1, wherein of the shifting devices functionally assigned to a shift actuator, always only one is actuatable.

10. The planetary-gear automatic transmission according to claim 1, wherein the transmission has four planetary gear sets.

11. The planetary-gear automatic transmission according to claim 1, wherein the transmission has at least six shifting devices.

* * * * *